(12) United States Patent
Heizenroeder

(10) Patent No.: US 10,031,008 B2
(45) Date of Patent: Jul. 24, 2018

(54) ELECTROMAGNETIC FLOW METER

(71) Applicant: Sensus USA, Inc., Raleigh, NC (US)

(72) Inventor: Christian Heizenroeder, Raleigh, NC (US)

(73) Assignee: Sensus USA, Inc., Raleigh, NC (US)

( * ) Notice: Subject to any disclaimer, the term of this patent is extended or adjusted under 35 U.S.C. 154(b) by 114 days.

(21) Appl. No.: 15/171,660

(22) Filed: Jun. 2, 2016

(65) Prior Publication Data

US 2017/0350738 A1    Dec. 7, 2017

(51) Int. Cl.
*G01F 1/58* (2006.01)

(52) U.S. Cl.
CPC ................... *G01F 1/584* (2013.01)

(58) Field of Classification Search
CPC ... G01F 1/58; G01F 1/60; G01F 1/582; G01F 1/588; G01F 1/584; G01F 1/002; F17C 9/00; F17C 13/026; G01P 5/08; G01D 11/30; G01D 11/245; G21C 17/017
USPC ............... 73/861.11–861.17, 866.5
See application file for complete search history.

(56) References Cited

U.S. PATENT DOCUMENTS

| 4,517,846 A * | 5/1985 | Harrison ................. | G01F 1/584 73/861.12 |
| 4,767,953 A * | 8/1988 | Furuya ................... | H02K 44/04 310/11 |

FOREIGN PATENT DOCUMENTS

EP    0892252 B1    12/2011

OTHER PUBLICATIONS (English Translation), Yuichi et al., Electromagnetic flowmeter and method for attaching electrode of the electromagnetic flowmeter, Dec. 2015, Yokogawa Electric Corp, pp. 1-9.*
Ke, Li et al., "Electromagnetic Flow Meters Achieve High Accuracy in Industrial Applications", Analog Dialogue 48-02 www.analog.com/analogdialogue, Feb. 2014, 1-9.
Unknown Author, "iPERL Water Management System: Electromagnetic Flow Measurement System", SENSUS WDS-10006-02 iPERL Water Management System: Electromagnetic Flow Measurement System, 1-3.

* cited by examiner

*Primary Examiner* — John Fitzgerald
*Assistant Examiner* — Truong D Phan
(74) *Attorney, Agent, or Firm* — Murphy, Bilak & Homiller, PLLC

(57)    ABSTRACT

In an aspect, an electromagnetic flow meter assembly includes a flow tube housing having a flow inlet and a flow outlet at opposing ends of a fluid passageway running through the flow tube housing and further having an electrode receptacle defining a cavity opening into the fluid passageway. The flow meter assembly also includes an electrode positioned within the electrode receptacle and having a sensing end surrounded by a porous plug fitted within the cavity, said porous plug providing wetted exposure of the sensing end of the electrode when the fluid passageway is filled with fluid. The flow meter assembly further includes one or more channels configured to vent entrained gas from around the porous plug when the porous plug is fitted within the cavity and the fluid passageway is filled with fluid.

5 Claims, 6 Drawing Sheets

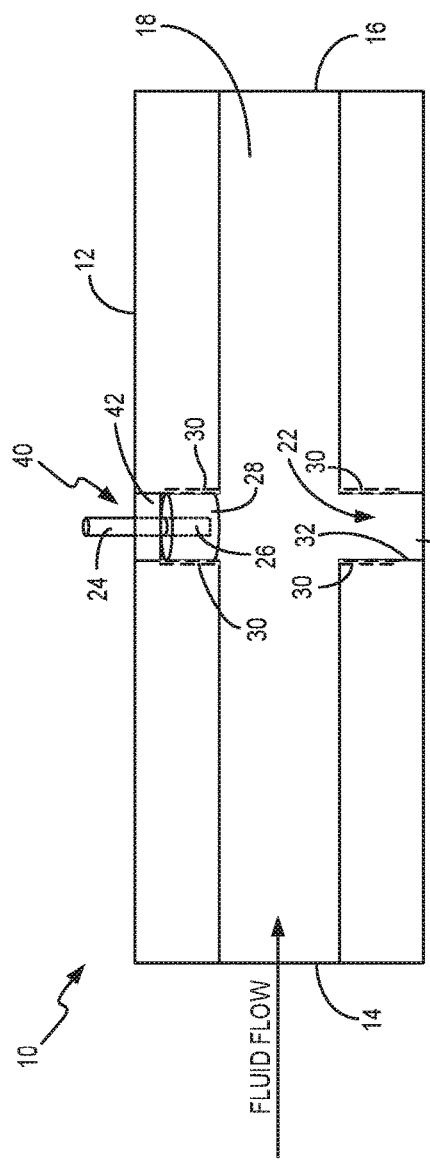
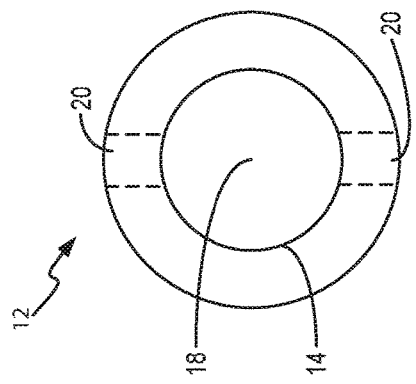

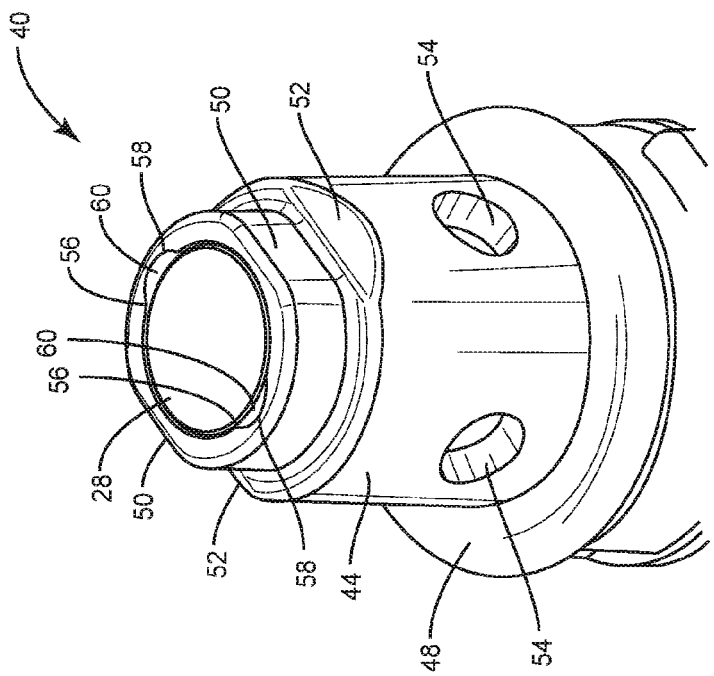
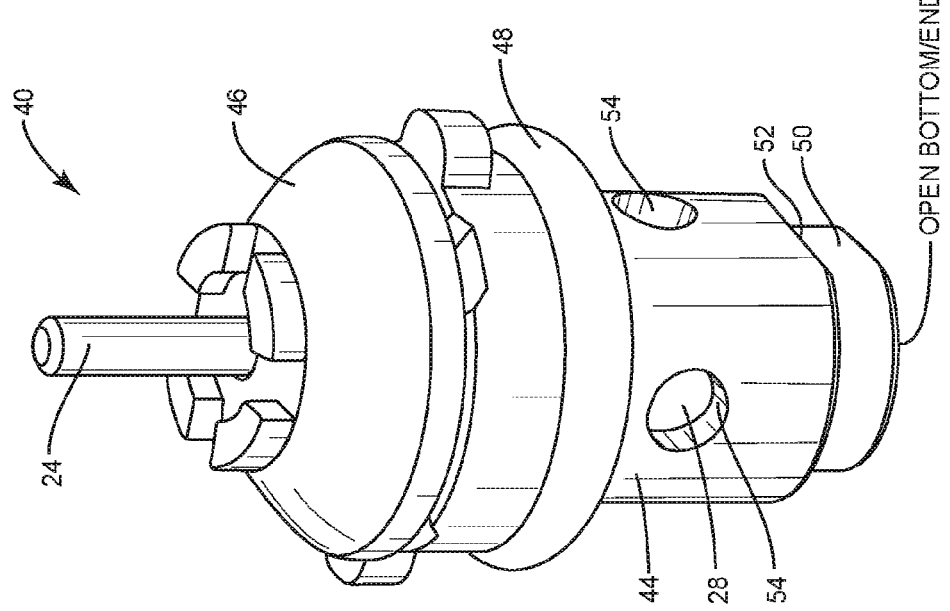
FIG. 6
FIG. 5

ELECTROMAGNETIC FLOW METER

TECHNICAL FIELD

The present elates to flow meters, and particularly relates to electromagnetic flow meters.

BACKGROUND

Utility companies commonly use flow meter assemblies to measure a fluid flowing through a conduit to a residential or commercial end user. For example, when water flows through a flow tube housing of an electromagnetic flow meter assembly, it wets a porous material (e.g., graphite, porous plastic or gypsum) that surrounds an electrode in a cavity of the flow tube housing. The wetted surface of this porous material contacts an active surface of the electrode and the flow meter assembly uses magnetive induction to determine a rate of the water flow through the fluid passageway.

It is recognized herein that when a flow tube is filled with fluid, air bubbles or particles become trapped between the wetted surface of the porous material and the active surface of the electrode. This changes the surface area in which the wetted surface contacts the active surface of the electrode. Without a constant active/wetted surface area, the measurements of the flow meter assembly become inaccurate. This problem is exacerbated with changes in water pressure.

SUMMARY

According to one aspect of the teachings herein, an electromagnetic flow meter assembly includes one or more channels in or surrounding the porous plug(s) that are used to provide wetted exposure of the sensing electrodes to the fluid flowing within the flow tube of the flow meter. The channels provide a circulation or exhaust mechanism that reduces or eliminates pockets of air or other gas from forming in the interstices surrounding the plug.

In an example embodiment, an electromagnetic flow teeter assembly includes a flow tube housing with a flow inlet and a flow outlet at opposing ends of a fluid passageway running through the flow tube housing. The flow meter assembly also includes an electrode receptacle that defines a cavity opening into the fluid passageway and an electrode positioned within the electrode receptacle. The electrode has a sensing end surrounded by a porous plug fitted within the cavity. The porous plug provides wetted exposure of the sensing end of the electrode when the fluid passageway is filled with fluid. The flow meter assembly further includes one or more channels configured to vent entrained gas from around the porous plug when the porous plug is fitted within the cavity and the fluid passageway is filled with fluid.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is cross-sectional view of one embodiment of an electromagnetic flow meter assembly.

FIG. 2 is an end view of the electromagnetic flow meter assembly.

FIG. 5 is a perspective view of an electrode module assembly, for use in one or more embodiments of an electromagnetic flow meter assembly.

FIG. 6 is a perspective view of a bottom, wetted end of the electrode module assembly.

DETAILED DESCRIPTION

Figure 3:
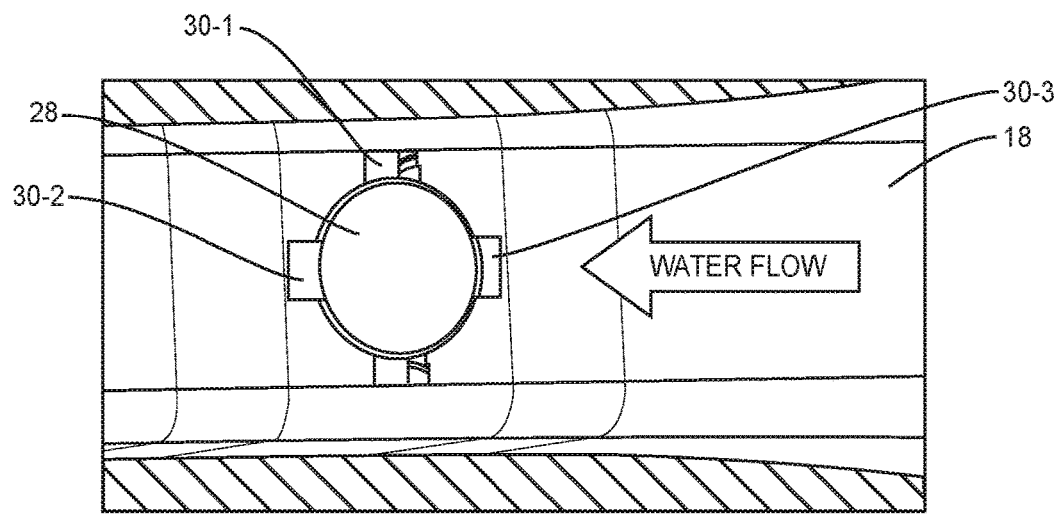
FIG. 3 is a perspective, cut-away view of an interior fluid passageway of the electromagnetic flow meter assembly, and depicts one or more channels configured to vent entrained gas from around porous plug used for wetting exposure of a sensing electrode of the electromagnetic flow meter.

FIG. 1 is cross-sectional view of an embodiment of an electromagnetic flow meter assembly 10. The electromagnetic flow meter assembly 10 includes a flow tube housing 12 with a flow inlet 14 and a flow outlet 16 at opposing ends of a fluid passageway 18 running through the flow tube housing 12. The flow tube housing 12 has at least one electrode receptacle 20 that defines a cavity 22 that opens into the fluid passageway 18.

An electrode 24, used for electromagnetic flow sensing, is positioned within the electrode receptacle 20 and has a sensing end 26 surrounded by a porous plug 28 fitted within the cavity 22. The porous plug 28 provides wetted exposure of the sensing end 26 of the electrode 24 when the fluid passageway 18 is filled with fluid. One or more channels 30 along the inner wall 32 of the electrode receptacle 20 are configured to vent entrained gas from around the porous plug 28 when the porous plug 28 is fitted within the cavity 22 and the fluid passageway 18 is filled with fluid.

Barrier 42 seals off the upper portion of the cavity 22 from the fluid while allowing the fluid to pass over and around the porous plug 28. The fluid flowing around the porous plug 28 via the channels 30 provides for at least some circulation or venting of gas that may otherwise accumulate or become trapped in the interstices between the porous plug 28 and the cavity 22.

Figure 4:
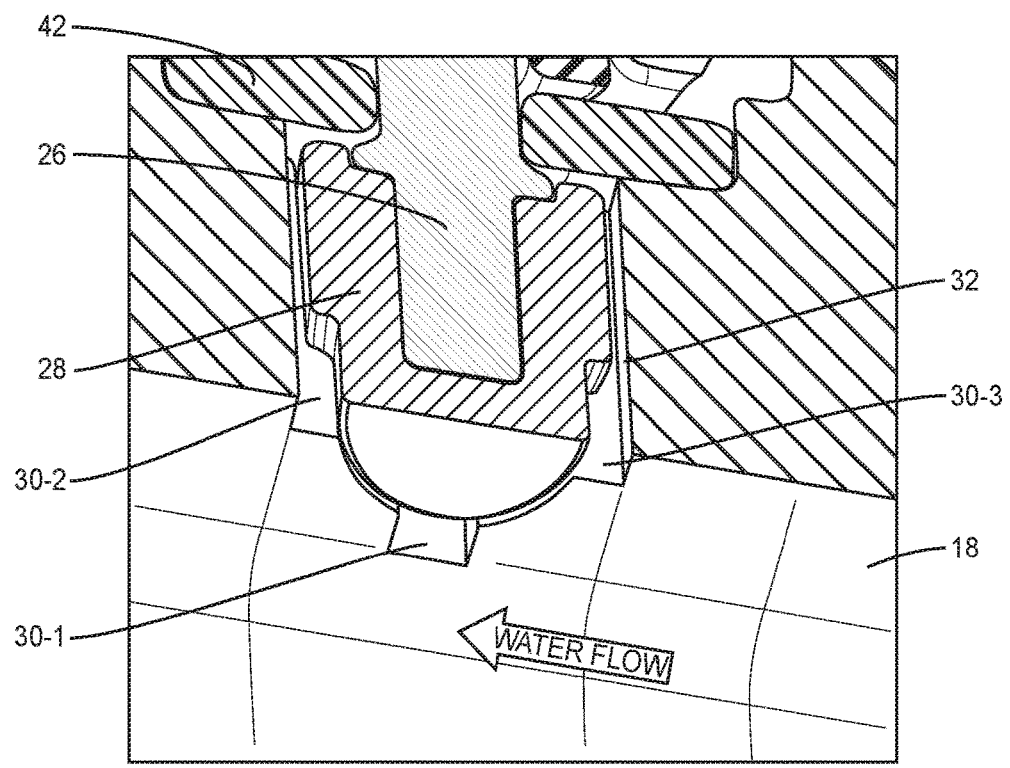
FIG. 4 is another perspective view of the interior fluid passageway of the electromagnetic flow meter assembly of FIG. 3.

FIG. 2 illustrates an end view of the electromagnetic flow assembly, and provides a further perspective on the receptacle 20, while FIGS. 3 and 4 provide perspective, cut-away views of the fluid passageway 18 of the electromagnetic flow meter assembly 10. In particular, FIGS. 3 and 4 depict channels 30 (30-1, 30-2 and 30-3) that are configured to vent entrained gas and/or particles from around porous plug 28 back into the fluid passageway 18.

In an example, water flows through the fluid passageway 18 and enters one or two of the channels 30-1, 30-2 and 30-3 that surround the porous plug 28. The channels 30-1, 30-2 and 30-3, in this embodiment, are formed, in part, between the outer wall of the porous plug 28 and the inner wall 32 of the electrode receptacle 20. The water flows around the porous plug 28 within the electrode receptacle 20 and back out into the fluid passageway 18.

As shown by FIG. 4, the water flow is sealed off from the remainder of the electromagnetic flow meter assembly 10 by a barrier 42, which may be a seal such as an O-ring. A gap may remain between the barrier 42 and the upper portion of the porous plug 28, such that fluid may flow above the porous plug 28 and provide for further circulation with respect to the channels 30. For instance, a portion of the water may flow from the fluid passageway 18, into the upstream channel 30-3 and exhaust through back into the fluid passageway 18 via the downstream channels 30-1 and 30-2. Such circulation and, more generally, the presence of one or more channels 30, will be understood as reducing or eliminating the buildup of gaseous pockets around the porous plug 28.

Figure 7:
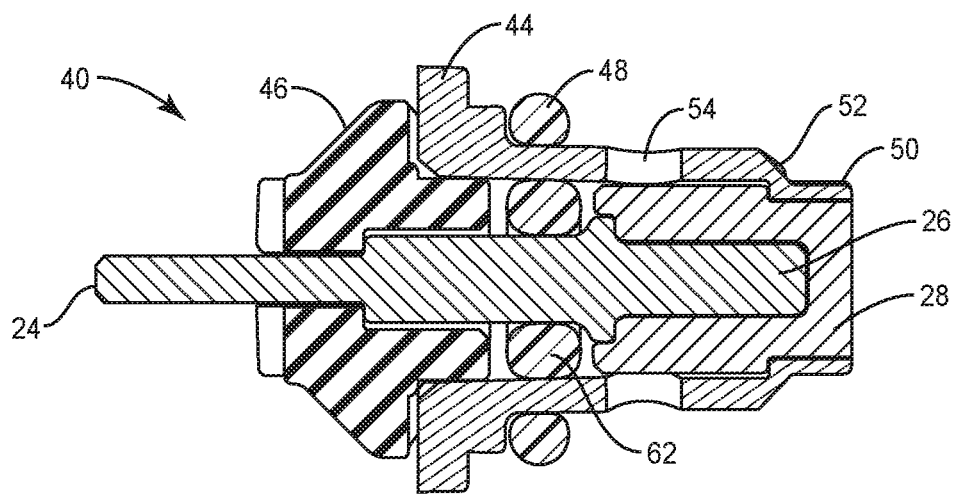
FIG. 7 is a cross-sectional view of the electrode module assembly.

In some embodiments, additional structures may be used to aid circulation or venting around the porous plug 28. The functionality of such structures may be better appreciated with respect to the various views provided in FIGS. 5-7. FIG. 5 is a perspective view of an embodiment of an electrode module assembly 40 that is configured to be seated in the electrode receptacle 20 with an electrode 24, a porous plug 28 and an electrode carrier. FIG. 6 is a perspective view of a bottom, wetted end of the electrode module assembly 40. FIG. 7 is a cross-sectional view of the electrode module assembly 40.

In this embodiment, the electrode carrier comprises a sleeve 44 configured to surround the porous plug 28 and fit the porous plug 28 within the cavity 22 of the electrode receptacle 20. It will be understood that the electrode receptacle 20 that will receive the electrode module assembly 40 includes a cavity 22 that is sized to provide a relatively tight fit, for secure positioning of the sleeve 44 and its included porous plug 28. Rather than forming the channels 30 within the walls of the surrounding cavity 22, such as suggested in the examples of FIGS. 3 and 4, the sleeve 44 includes a number of features that, collectively, provide the channels 30, when sleeve 44 is seated into the surrounding cavity 22.

In some embodiments, these sleeve features include one or more keyed sections 50, one or more beveled sections 52, and one or more ports 54, and, as seen in FIG. 6 in particular, one car more grooves 58 formed in an inner wall 56 of the sleeve 44, within the plug-holding portion of the sleeve 44. The grooves 58 form openings denoted in FIG. 6 as channels 60. It shall be understood in this regard that the channels 30 may be a composite or combination of channels.

Thus, the channels 60 formed by the grooves 58 provide openings that pass through the interior interstices between the porous plug 28 and the surrounding internal walls of the sleeve 44. Correspondingly, the ports 54 place the interior of the sleeve 44 into fluid communication with the exterior interstices between the exterior of the sleeve 44 and the surrounding walls of the cavity 22. In turn, the beveled sections 52 work in concert with the keyed sections 50, to place the exterior interstices in fluid communication with the fluid passageway 18.

Figure 8:
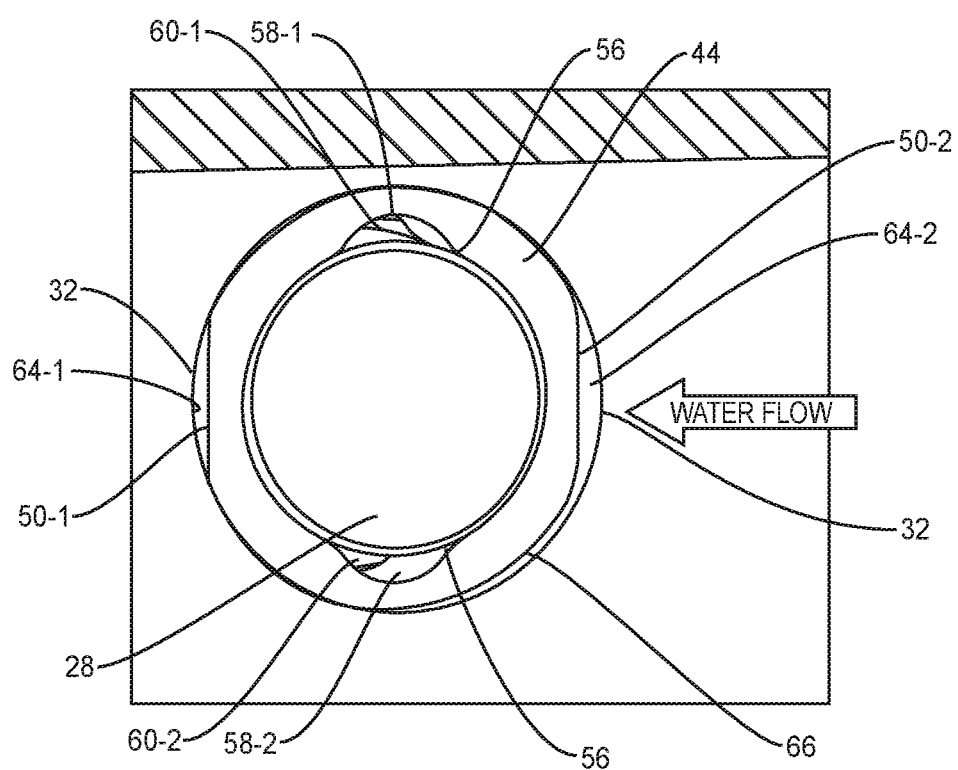
FIG. 8 is a perspective view of the interior fluid passageway of an electromagnetic flow meter assembly fitted with the electrode module assembly of FIGS. 5-7.
Figure 9:
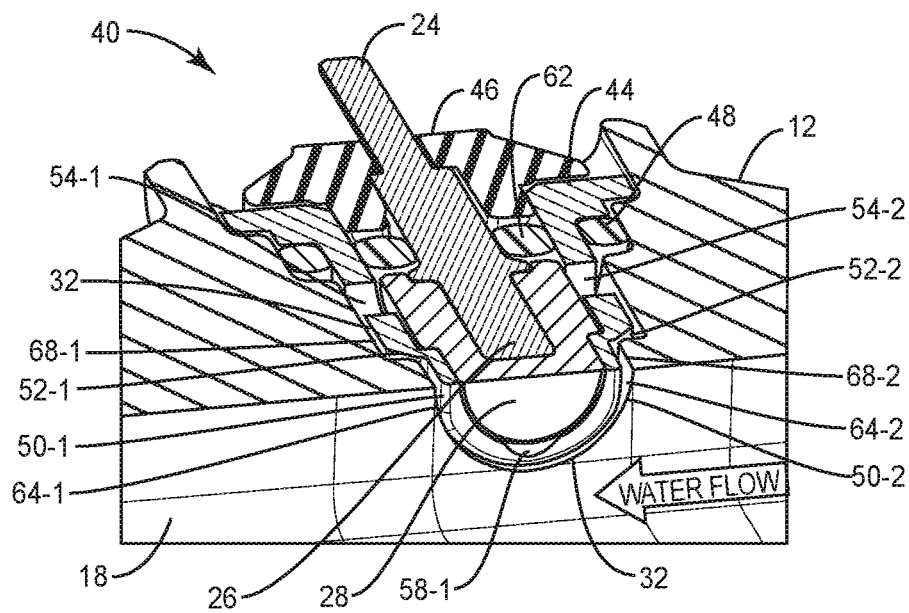
FIG. 9 is a perspective, cut-away view of the interior fluid passageway of the electromagnetic flow meter assembly of FIG. 8.

FIG. 8 is a perspective view of the fluid passageway 18 of the electromagnetic flow meter assembly 10, wherein the electrode module assembly 40 of FIGS. 5-7 is fitted into its corresponding cavity 22. FIG. 9 is a perspective, cut-away view for the same scenario.

In these views, first channels 60-1 and 60-2 are visible, formed by grooves 58-1 and 58-2 in inner wall 56 of the sleeve 44. These views also show two spaced apart second channels 64-1 and 64-2 that are formed, via the keyed sections 50 of the sleeve 44, between the outer wall 66 of the sleeve 44 and the inner wall 32 that defines the cavity 22.

Figure 10:
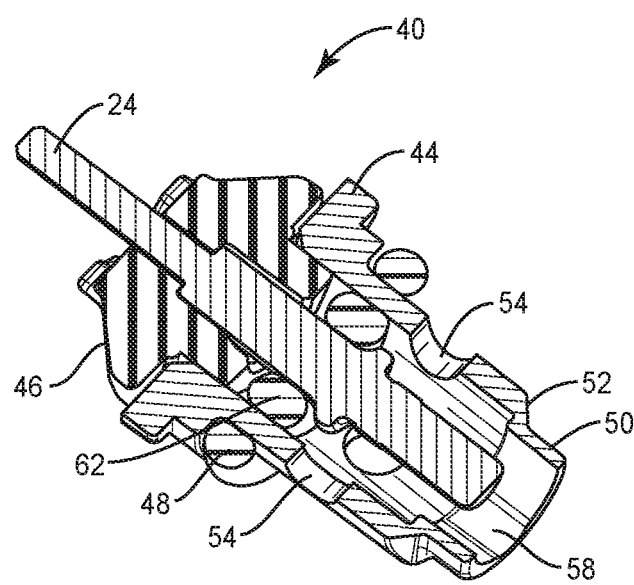
FIG. 10 is another perspective, cut-away view of the electrode module assembly of FIGS. 5-7, with the porous plug omitted to highlight certain interior details.

FIG. 10 is another perspective, cut-away view of the electrode module assembly 40 of FIGS. 5-7, with the porous plug omitted to highlight certain interior details, such as the grooves 58 and ports 54 in the sleeve 44. In particular, FIG. 10 provides a good sense of how various features 50, 52, 54, and 58 cooperate to provide composite channels 30, that provide fluid circulation in and around the porous plug 28. Of course, the shape, grooves and ports of the sleeve 44 may vary in dependence on the number of channels 30 desired, and on the shape or depth of the cavity 22, etc.

With FIGS. 8-10 in mind, it will be appreciated that the fluid filling the fluid passageway 18 may circulate in around the porous plug 28, e.g., by flowing into the first channels 60 and flowing out of the second channels 64, or vice versa. Fundamentally, the ports 54 place the first and second channels 60 and 64 into fluid communication. More broadly, the ports 54 place the interior of the sleeve 44 into fluid communication with the interstitial space between the sleeve exterior and the inner wall(s) 32 of the cavity 22, the first communication channels 60 provide for flow into or out of the sleeve interior, and the second communication channels provide for flow into or out of the interstitial space surrounding the sleeve 44.

Figure 11:
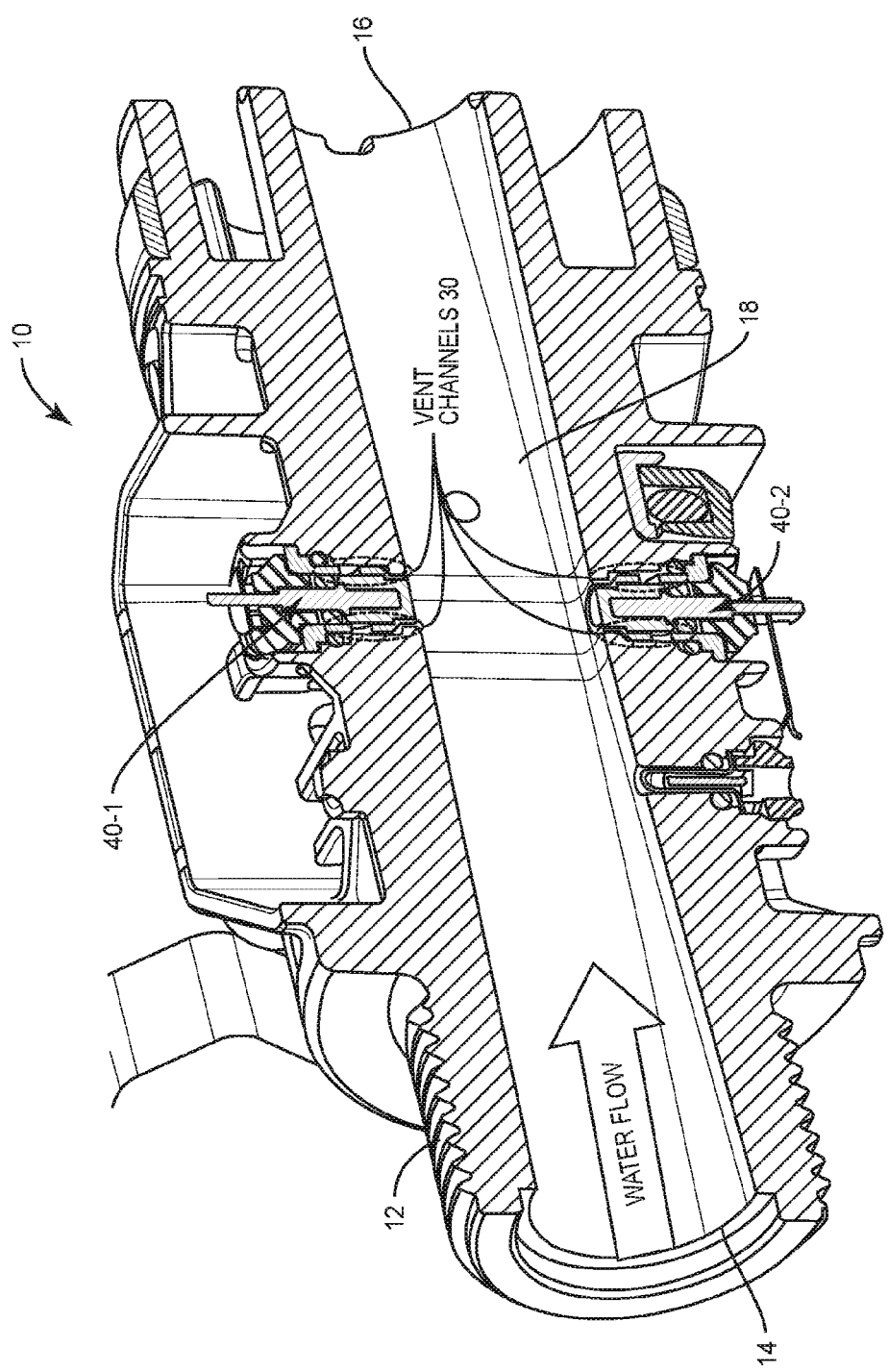
FIG. 11 is a perspective, cut-away view of an electromagnetic flow meter assembly, including a pair of electrode module assemblies installed.

FIG. 11 is a broader cut-away view of the electromagnetic flow meter assembly 10 in which a pair of electrode module assemblies 40-1, 40-2 is installed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An electromagnetic flow meter assembly comprising:
    a flow tube housing having a flow inlet and a flow outlet at opposing ends of a fluid passageway running through the flow tube housing and further having an electrode receptacle defining a cavity opening into the fluid passageway;
    an electrode positioned within the electrode receptacle and having a sensing end surrounded by a porous plug fitted within the cavity, said porous plug providing wetted exposure of the sensing end of the electrode when the fluid passageway is filled with fluid; and
    one or more channels configured to vent entrained gas from around the porous plug when the porous plug is fitted within the cavity and the fluid passageway is filled with fluid;
    wherein the electrode comprises part of an electrode module assembly that is configured to be seated in the electrode receptacle and comprises the electrode, the porous plug, and an electrode carrier comprising a sleeve configured to surround the porous plug and fit the porous plug within the cavity of the electrode receptacle.

2. The electromagnetic flow meter assembly of claim 1, wherein the one or more channels comprise a first channel between the porous plug and an inner wall of the sleeve, said first channel formed via a groove in the inner wall of the sleeve and opening into the fluid passageway when the electrode module assembly is seated in the electrode receptacle.

3. The electromagnetic flow meter assembly of claim 2, wherein the one or more channels further comprise one or more second channels, each formed in a cavity wall defining said cavity and opening into the fluid passageway, and wherein the sleeve includes one or more ports through a sleeve wall that place the first and second channels in fluid communication.

4. The electromagnetic flow meter assembly of claim 2, wherein the one or more channels further comprise a second channel formed between an outer wall of the sleeve and the inner wall of the electrode receptacle, said second channel opening into the fluid passageway when the electrode module assembly is seated in the electrode receptacle, and wherein the sleeve includes one or more ports through the wall of the sleeve that place the first and second channels in fluid communication.

5. The electromagnetic flow meter assembly of claim 4, wherein the first channel comprises two or more spaced apart first channels, and wherein the second channel comprises two or more spaced apart second channels.

\* \* \* \* \*